United States Patent

Yano

[11] Patent Number: 6,023,316
[45] Date of Patent: *Feb. 8, 2000

[54] BACK LIGHTED LIQUID CRYSTAL DISPLAY AND METHOD OF MANUFACTURE THEREOF

[75] Inventor: Tomoya Yano, Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/905,020

[22] Filed: Aug. 1, 1997

Related U.S. Application Data

[63] Continuation of application No. 08/515,052, Aug. 14, 1995, abandoned.

[30] Foreign Application Priority Data

Aug. 12, 1994 [JP] Japan ................................ P06-211798

[51] Int. Cl.$^7$ ................................................. G02F 1/1335
[52] U.S. Cl. ............................. 349/112; 349/62; 349/64; 349/96
[58] Field of Search ................. 359/48, 49, 69; 349/64, 112, 62, 96

[56] References Cited

U.S. PATENT DOCUMENTS

| 4,268,127 | 5/1981 | Oshima et al. | 349/112 |
| 5,161,041 | 11/1992 | Abileah et al. | 359/49 |
| 5,548,425 | 8/1996 | Adachi et al. | 359/69 |

FOREIGN PATENT DOCUMENTS

| 53-82443 | 7/1978 | Japan | 359/69 |
| 6-95099 | 4/1994 | Japan | 359/69 |

*Primary Examiner*—William L. Sikes
*Assistant Examiner*—Julie Ngo
*Attorney, Agent, or Firm*—Hill & Simpson

[57] ABSTRACT

A liquid crystal display includes a liquid crystal panel, a directional back light and light diffusing means. The liquid crystal panel is of the transmission type having a front face and a back face on the side opposite the front face. A polarizing plate is placed in front of the front face of the liquid crystal panel. The back light is placed on the backside of the liquid crystal panel, providing all incident illumination light beams to the liquid crystal panel. The light diffusing means is place on the front side of the liquid crystal panel, diffusing and emitting incident illumination light beams leaving the liquid crystal panel. The light diffusing layer includes transparent fine particles and transparent filler.

10 Claims, 5 Drawing Sheets

FIG. IA
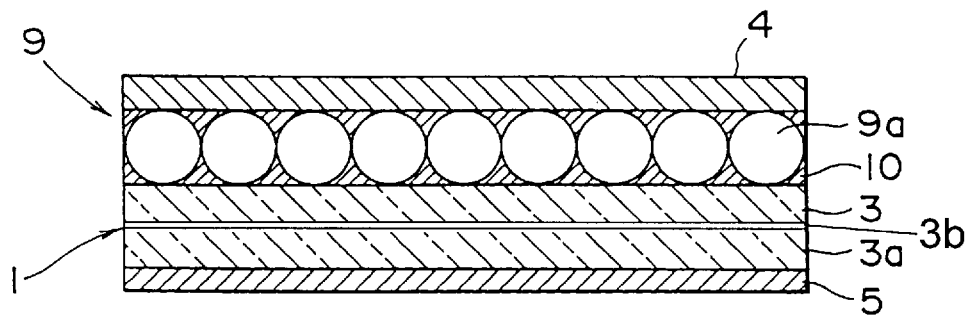
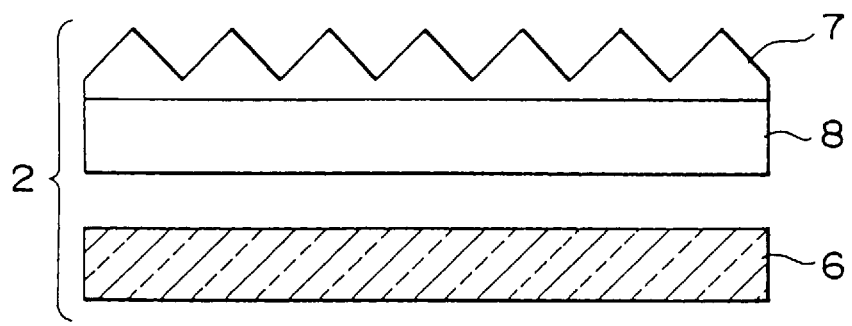
FIG. IB
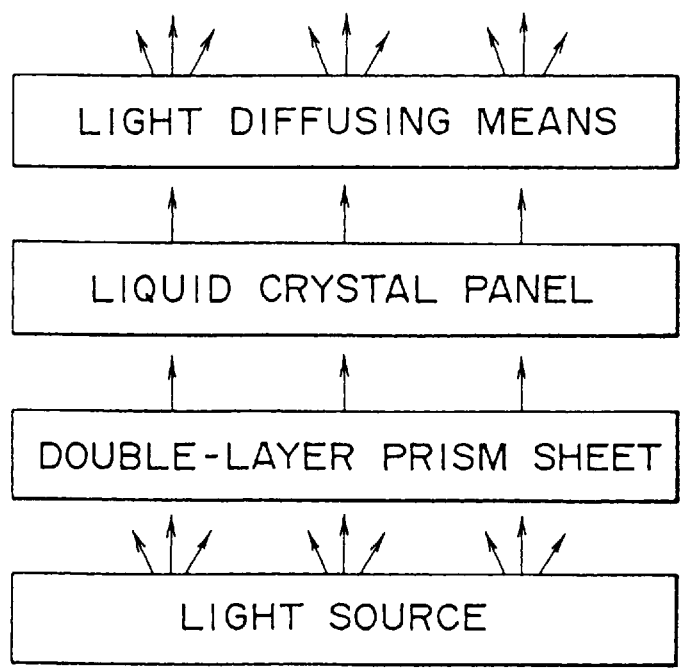

F I G. 5A
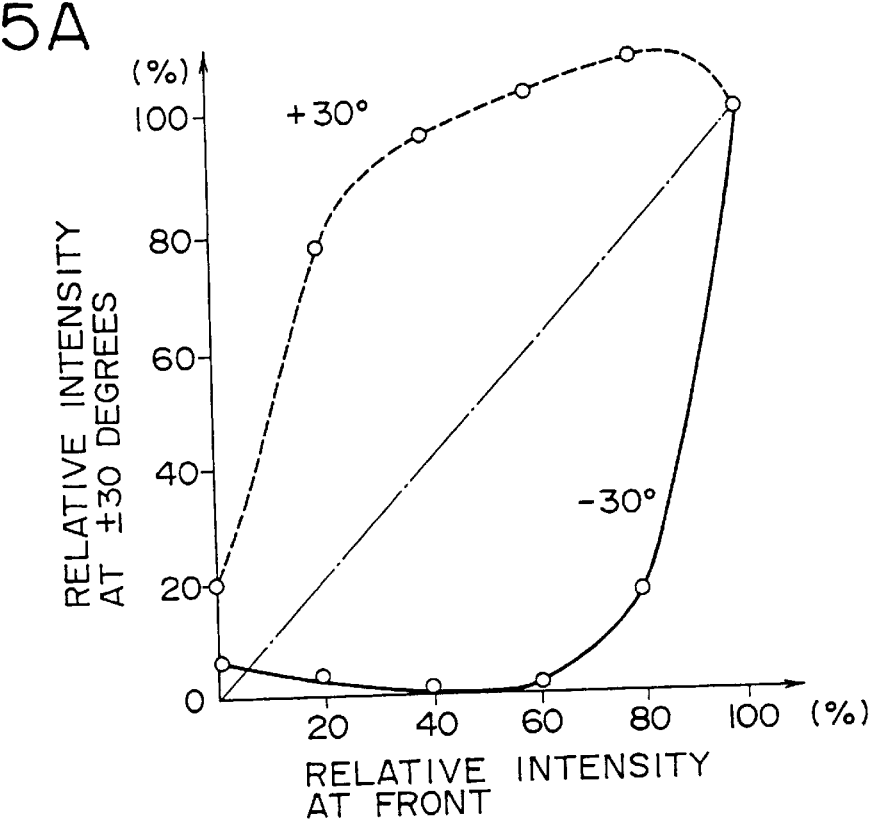
F I G. 5B
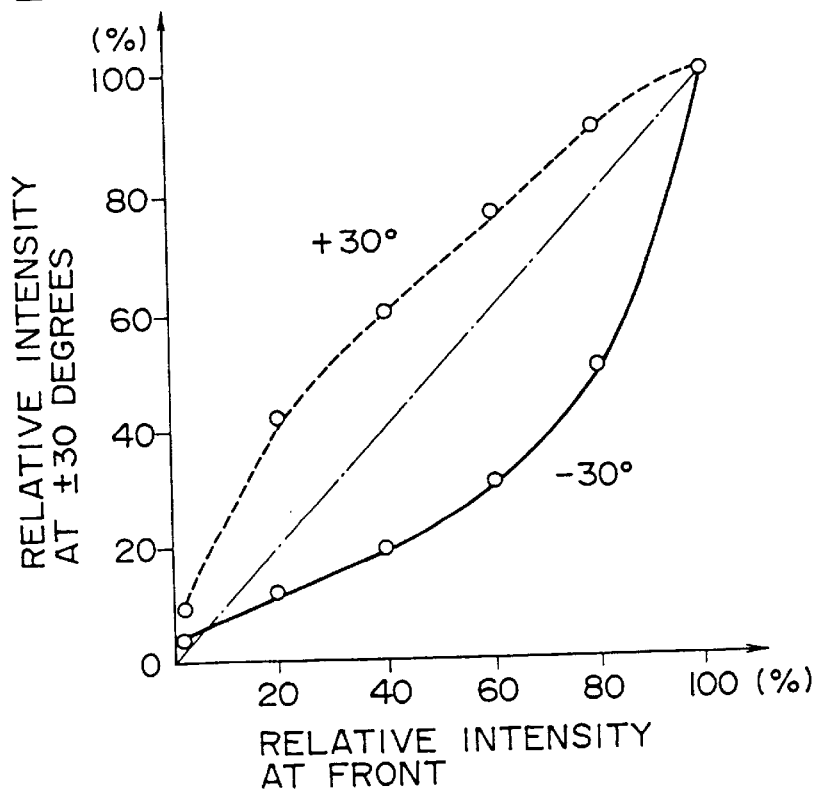

BACK LIGHTED LIQUID CRYSTAL DISPLAY AND METHOD OF MANUFACTURE THEREOF

This application is a continuation of application Ser. No. 08/515,052, filed on Aug. 14, 1995, now abandoned.

BACKGROUND OF THE INVENTION

1. Field of the Invention

The present invention relates to an illumination structure of a transmission liquid crystal display. More particularly, the present invention relates to an illumination structure comprising an assembly of a directional backlight placed on the back side of a transmission liquid crystal panel and a light diffusing member installed on the front side thereof. To further put it in even more detail, the present invention relates to a structure for preventing an external light arriving at the light diffusing member from being reflected thereby.

2. Description of Related Art

The liquid crystal display is characterized in that the structure thereof is flat and the amount of consumed power is small. Therefore, the liquid crystal display is becoming more and more popular and put to practical use mainly in applications such as hand-held calculators and watches in addition to vehicle onboard panels, measurement display units, office automation equipment and television receivers, to mention a few. Since the liquid crystal display has a property of generating no light, however, the use of the liquid crystal display at a dark place is not convenient. In order to make the liquid crystal display easier to see and to make it possible to use the liquid crystal display at a dark place, a backlight for generating illumination lights uniformly is developed to be placed on the back side thereof. An example of such a backlight is disclosed by Tsuruhara in Nikkei Materials (1987) 21. The degree to which the liquid crystal display is easy to see varies, depending upon the brightness of surrounding light (or external light). In particular, in the case of a liquid crystal display of the reflection type, the degree to which the liquid crystal display apparatus is easy to see is greatly affected by external light. In the case of a liquid crystal display of the transmission type adopting a backlight technique, on the other hand, its visual display power does not decrease, even if the level of the external light is low, by virtue of the back illumination by the backlight. In particular, in the case of an outdoor liquid crystal display such as a car onboard panel for which the brightness of the external light changes from the brightness quantity of the sunlight of the day time to that of a night light, the transmission type having a backlight is by all means required to sustain the high degree to which the liquid crystal display is easy to see.

As described earlier, the liquid crystal display offers a big advantage that the amount of power consumed thereby is small. However, the backlight for back illumination consumes a large amount of power, destroying the merit. Therefore, it is desirable to use a backlight having a high illumination efficiency. For this reason, in some cases, a backlight having an excellent directivity, that is, having a radiated-light distribution close to that of parallel beams is employed. By the way, the liquid crystal display has a variety of operation modes having something to do with the arrangement of liquid crystal molecules. In the case of a twist nematic (TN) mode, a super twist nematic (STN) mode or a birefringence (ECB) moder either of which is widely used, the transmissivity is dependent upon the visual field angle. FIG. 7 is a diagram showing the dependence of the transmissivity upon the visual field angle in the case of the TN mode. The figure shows a graph obtained from measurement of the transmissivity for a slanting direction forming an angle of 45 degrees with a line normal to the display screen. The figure also shows changes in transmissivity for all directions in the entire 360-degree range with the normal line taken as a center. It is obvious from the figure that, in three directions, the transmissivity is good but, in the remaining direction, the transmissivity becomes extremely poor, indicating the existence of the high dependence of the transmissivity upon the visual field angle. When the liquid crystal display is illuminated by a backlight with a good directivity, the incident illumination light goes all but straight ahead on. Accordingly, when observing the display screen from a position on the front side, the amount of light radiated in slanting directions is relatively small. As a result, in the case of a liquid crystal display which has a transmissivity depending upon the visual field angle, the brightness obtained in an observation at a position in a slanting direction becomes poor, giving rise to a problem that the visual display power deteriorates substantially.

In order to solve this problem, a structure wherein a light diffusing layer is placed on the radiating surface of the liquid crystal panel is proposed. An example of such a structure is disclosed in Japanese Patent Laid-Open No. Hei 6-95099. By providing a light diffusing layer, an incident illumination light arriving all but perpendicularly from a source at the back side passes through the liquid crystal panel, being diffused as well as emitted by the light diffusing layer to result in an optical distribution having also sufficient amounts of light in slanting directions. As a result, display brightness can be obtained at a practical level in each slanting direction, allowing the visual display power to be improved even for a liquid crystal panel with the transmissivity thereof dependent upon the visual field angle.

While the conventional light diffusing layer diffuses an incident illumination light, however, it also reflects an external light to a certain degree, giving rise to a problem that the display contrast becomes poor.

SUMMARY OF THE INVENTION

Addressing the problem, it is an object of the present invention to provide a light diffusing structure that can suppress the reflection of an external light.

In order to achieve the object of the present invention described above the following means is provided. The basic configuration of a liquid crystal display provided by the present invention comprises a transmission liquid crystal panel, a directional backlight and light diffusing means. The transmission liquid crystal panel comprises a front face and a back face on the side opposite to the front face. A polarizing plate is placed in front of the front face. The directional backlight is installed on the back side of the liquid crystal panel, generating substantially perpendicular incident illumination lights to be applied to the liquid crystal panel. The light diffusing means is installed on the front side of the liquid crystal panel for diffusing and radiating the incident illumination lights that are transmitted by the liquid crystal panel. The liquid crystal display is characterized in that the light diffusing means comprises a light diffusing layer and transparent filler stuff. The light diffusing layer is made of transparent fine particles spread all over the gap between the front face of the liquid crystal panel and the polarizing plate. The filler stuff is also transparent, filling up gaps among the transparent fine particles.

In this configuration, the transparent fine particles have a refraction index different from that of a glass plate constituting the front face of the liquid crystal panel while the transparent filler stuff has a refraction index close to that of the glass plate.

The liquid crystal display described above can be manufactured by using the following processes. First of all, in an assembly process, a liquid crystal panel is assembled by sticking a pair of glass plates to each other and filling up the gap between the two glass plates with a liquid crystal. In a subsequent coating process, the surface of one of the glass plates composing the liquid crystal panel is coated with transparent filler stuff to provide a junction layer. In a subsequent dissemination process, transparent fine particles are disseminated on a polarizing plate, on which an adhesive film has been created in advance, to create a uniformly spread light diffusing layer. Finally, in a crimping process, the light diffusing layer is superimposed on the junction layer and both the layers are pressed against each other to create a single assembly with gaps among the transparent fine particles filled up with the transparent filler stuff. Ideally, in the above coating process, the glass plate is coated with ultraviolet-light hardening transparent filler stuff and, in the crimping process, while the polarizing plate and the liquid crystal panel are being stuck to each other, an ultraviolet light is applied thereto.

According to the present invention, a backlight having an excellent directivity, that is, having a radiated-light distribution close to that of parallel beams is employed for illuminating a transmission liquid crystal panel with a high degree of efficiency. In addition, light diffusing means is provided on the front side of the liquid crystal panel. In this way, an incident illumination light arriving at the liquid crystal panel substantially perpendicularly to the liquid crystal panel is diffused and radiated by the light diffusing means in slanting directions after passing through the liquid crystal panel to result in a light distribution also having sufficient amounts of light in the slanting directions. As a result, display brightness can be obtained at a practical level in each slanting direction, allowing the visual display power to be improved even for a liquid crystal panel with the transmissivity thereof dependent upon the visual field angle. Furthermore, the light diffusing means is made up of a diffusing layer of transparent fine particles spread all over the gap between the front face of the liquid crystal panel and the polarizing plate, and transparent filler stuff is used for filling up gaps among the transparent fine particles. The transparent fine particles have a refraction index different from that of a glass plate constituting the front face of the liquid crystal panel while the transparent filler stuff has a refraction index close to that of the glass plate. As a result, the transparent fine particles exhibit a function capable of sufficiently diffusing an incident illumination light and the transparent filler stuff embedded in the gaps among the transparent fine particles can suppress the reflection of an external light. In particular, the reflection of an external light by the back face of the polarizing plate and the front face of the glass plate can be suppressed, allowing the display contrast to be improved substantially.

BRIEF DESCRIPTION OF THE DRAWINGS

FIG. 1A is a model diagram showing a cross section of the basic configuration of a liquid crystal display provided by the present invention;

FIG. 1B is a functional block diagram of the liquid crystal display apparatus;

FIGS. 5A and 5B show graphs showing effects of improving the dependence of the transmissivity on the visual field angle obtained by virtue of the present invention;

DETAILED DESCRIPTION OF THE PREFERRED EMBODIMENTS

Figure 2:
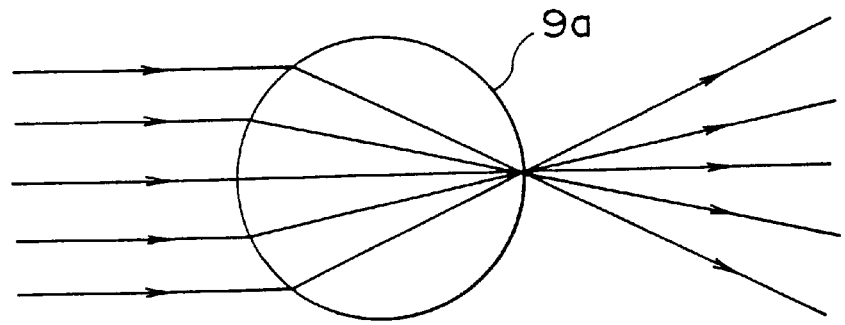
FIG. 2 is an explanatory diagram used for explaining optical effects of transparent fine particles.

The present invention will become apparent from the following detailed description of preferred embodiments with reference to accompanying diagrams. FIG. 1A is a model diagram showing a cross section of the basic configuration of a liquid crystal display apparatus provided by the present invention. FIG. 1B is a functional block diagram of the liquid crystal display. As shown in FIG. 1A, the liquid crystal display comprises a transmission liquid crystal panel 1, a directional backlight 2 and light diffusing means. The liquid crystal panel 1 comprises a pair of glass plate 3 and 3a with a liquid crystal 3b filling up the gap between the two glass plates 3 and 3a and sealed therein. A polarizing plate 4 is installed on the front side of the glass plate 3 whereas a polarizing plate 5 is placed on the back side of the glass plate 3a. The glass plates 3 and 3a each have a typical refraction index of about 1.53. The directional backlight 2 is installed on the back side of the liquid crystal panel 1, applying substantially perpendicular incident illumination lights to the liquid crystal panel 1. In this example, the directional backlight 2 comprises a light source 6 and two layers of prism sheets 7 and 8 placed one upon another. The light source 6 is a planar fluorescent tube which radiates lights in no specific directions. Receiving lights radiated by the light source 6 in no specific directions, the prism sheets 7 and 8 reflects and refracts the lights, converting them into substantially all parallel beams. The two layers of prism sheets 7 and 8 placed one upon another perpendicularly to each other collimate the lights generated by the light source 6 into parallel beams which are spread in two-dimensional directions, allowing incident illumination lights substantially all perpendicular to the liquid crystal panel 1 to be passed on to the liquid crystal panel 1. The BEF90 made by 3M corporation is typically used as the prism sheets 7 and 8.

Light diffusing means is placed on the front side of the liquid crystal panel 1, diffusing and emitting incident illumination lights leaving the liquid crystal panel 1. The light diffusing means comprises a light diffusing layer 9 and transparent filler stuff 10. The light diffusing layer 9 is made of transparent fine particles 9a spread all over the gap between the front face of the liquid crystal panel 1 and the polarizing plate 4. The filler stuff 10 is also transparent, filling up gaps among the transparent fine particles 9a. In this configuration, the transparent fine particles 9a have a refraction index different from that of the glass plate 3 constituting the front face of the liquid crystal panel 1 while the transparent filler stuff 10 has a refraction index close to that of the glass plate 3. Typically, the transparent fine particles 9a are each a transparent micro bead with an average particle diameter of about 30 μm and a refraction index of 1.93, which is much different from a refraction index of 1.53 of the glass plate 3, offering an excellent light diffusing characteristic. It should be noted that the thickness of the glass plate 3 is typically about 1.1 mm. On the other hand, the transparent filler stuff 10 is typically made of resin which has a property to be hardened when an ultraviolet light is applied thereto. A product manufactured by Three Bonds Corporation with the trademark 3042 (a degenerated acrylate family) can be used as the transparent filler stuff 10. Its refraction index is 1.55 which is all but equal to that of the glass plate 3. By filling up the gap between the polarizing plate 4 and the glass plate 3 with the transparent filler stuff 10 in this way, at least, the reflection of an external light on the back side of the polarizing plate 4 and at the front side of the glass plate 3 can be suppressed effectively.

FIG. 1B is a functional block diagram of the liquid crystal display apparatus described above. As described above, the light source 6 is a planar fluorescent tube which radiates lights in no specific directions. The two-layer prism sheet converts the lights generated by the light source 6 into substantially all perpendicular incident illumination beams applied to the back face of the liquid crystal panel 1. As a result, light generated by the light source 6 can be utilized efficiently, allowing the liquid crystal panel 1 to be illuminated brightly. A light leaving the liquid crystal panel 1 is diffused and then emitted by the light diffusing means. Accordingly, a relatively bright display screen can be recognized even if the front face of the liquid crystal panel is observed from a position in a slanting direction. In addition, the light diffusing means can also suppress the reflection of an external light, allowing the contrast of a picture displayed on the liquid crystal panel 1 to be improved.

FIG. 2 is an explanatory diagram used for explaining optical effects of the transparent spherical transparent fine particle 9a. With the refraction index of the transparent fine particle 9a having a value in the range 1.4 to 2.5, the transparent fine particle 9a works as a microlens with one of the end surfaces thereof serving as a focus. For this reason, an array of microlenses can be produced in volume and at a low cost by arranging such transparent fine particles 9a on the glass plate. After passing through the liquid crystal panel 1, an incident illumination light beam originally emitted by the directional backlight is converged by a transparent fine particle 9a and then dispersed from the end surface. On the other hand, the reflection of most of external lights is suppressed by the transparent filler stuff 10 filling up gaps among the transparent fine particles 9a. The larger the refraction index of the transparent fine particle 9a, the more the lights are diffused and, hence, the larger the visual field angle. However, the incident illumination light includes some slanting components in addition to the parallel ones and, the higher the refraction index, the more the slanting components are diffused as they travel forward. As a result, the display contrast inevitably exhibits a trend of deterioration. For this reason, it is desirable to set the refraction index at a value which takes a well balanced tradeoff between the visual-field angle and the contrast into consideration.

Figure 3:
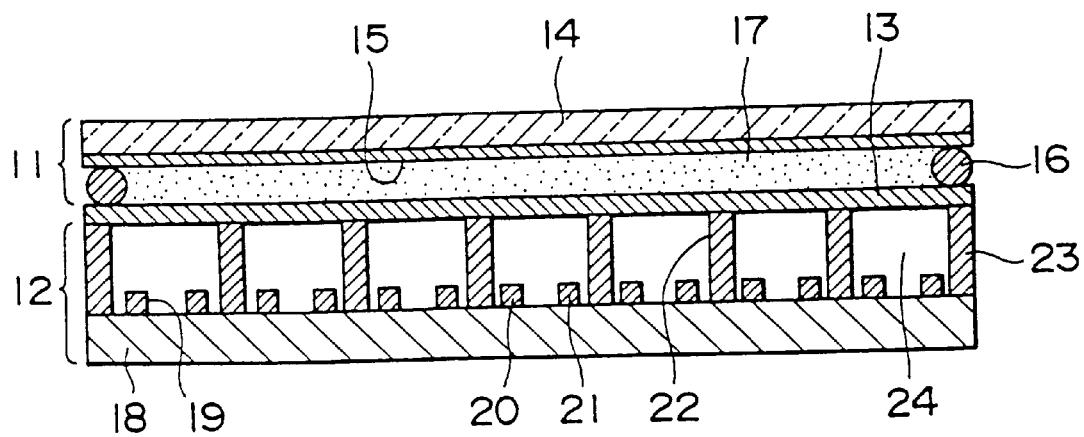
FIG. 3 is a model diagram showing a cross section of a typical liquid crystal panel.

FIG. 3 is a model diagram showing a cross section of a liquid crystal panel. The liquid crystal panel has a flat panel structure a pile of three layers: a liquid crystal cell 11, a plasma cell 12 and a dielectric sheet used as a common middle layer 13 sandwiched by the liquid crystal and plasma cells 11 and 12. The liquid crystal cell 11 comprises a front-side glass plate 14 and a plurality of signal electrodes 15 formed in parallel to each other on the inside main surface of the glass plate 14. The signal electrodes 15 are each made of a transparent conductive film. The glass plate 14 is attached to the middle layer 13 through spacers 16 which provide a predetermined gap between the glass plate 14 and the middle layer 13. The gap is filled up with a liquid crystal 17.

On the other hand, the plasma cell 12 comprises a back-side glass plate 18. On the inside main surface of the glass plate 18, a plurality of plasma electrodes 19 are formed in a direction perpendicular to the direction of the signal electrodes 15. The plasma electrodes 19 form electrode pairs each comprising an anode 20 and a cathode 21 which are arranged alternately. On the inside surface of the glass plate 18, stripe-shaped barrier ribs 22 are created for forming segments each provided for a pair of an anode 20 and a cathode 21. The top of each of the barrier ribs 22 comes into contact with the middle layer 13. The glass plate 18 is joined to the middle layer 13 by means of frit seals 23. In this way, a hermetically sealed plasma chamber 24 is created between the glass plate 18 and the middle layer 13. The plasma chamber 24 is divided by the barrier ribs 22 into discharge areas which are each individually used as a scanning unit. Gas that can be ionized is enclosed in the hermetically sealed plasma chamber 24. Various kinds of gas that can be used include helium, neon, argon and mixtures of them. The scanning units constituting the divided plasma chamber 24 and driving units forming the signal electrodes 15 are perpendicular to each other, prescribing a matrix comprising pixels which are each located at an intersecting point of the scanning and driving units.

In the liquid crystal panel having the configuration described above, the plasma chamber 24, in which plasma discharge phenomena take place, is scanned sequentially one line after another. At the same time, a picture signal is applied to the signal electrodes 15 on the liquid crystal cell synchronously with the scanning operation to drive the display. When a plasma discharge phenomenon takes place in the plasma chamber 24, the inside of the plasma chamber 24 is brought to the anode potential all but uniformly and pixels are selected in line units. That is to say, the plasma chamber 24 functions as a sampling switch. When a picture signal is applied to each pixel with the plasma sampling switch put in a conducting state, a sampling-hold operation takes place, enabling the control to turn the pixels on or off. The picture signal is sustained on the pixels as it is even after the plasma sampling switch has been put in a nonconductive state.

As described above, the liquid crystal panel structure include barrier ribs 22 each having a shape resembling a stripe. When the liquid crystal panel is illuminated by means of the directional backlight placed on the back side thereof, an incident illumination light going straight ahead on is not obstructed by the barrier ribs 22 and can thus illuminate the liquid crystal cell 11 efficiently. When a non-directional backlight is used, on the other hand, light components entering the panel in slanting directions are obstructed by the side surfaces of the barrier ribs 22, causing the illumination efficiency to deteriorate. None the less, even in this case, the non-directional backlight used in conjunction with the layered structure of the plasma cell 12 having the stripe-shaped barrier ribs 22 is functionally equivalent to a directional backlight. As a result, by combining the liquid crystal panel with the light diffusing means, the dependence of the transmissivity of the liquid crystal cell 11 on the visual field angle can be reduced.

Figure 4A:
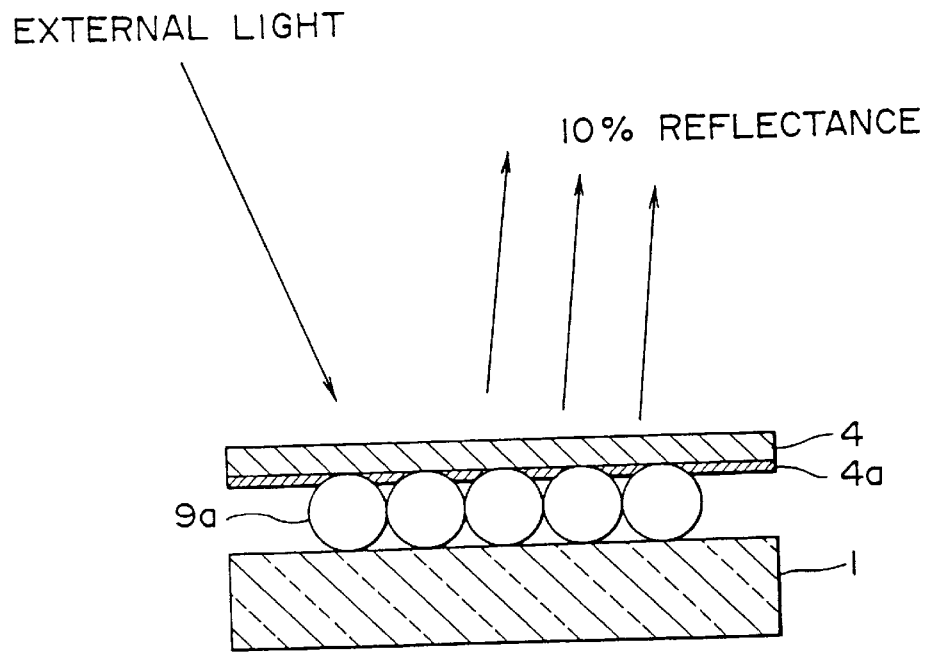
FIGS. 4A and 4B are model diagrams used for explaining a function to suppress the reflection of an external light in accordance with the present invention.
Figure 4B:
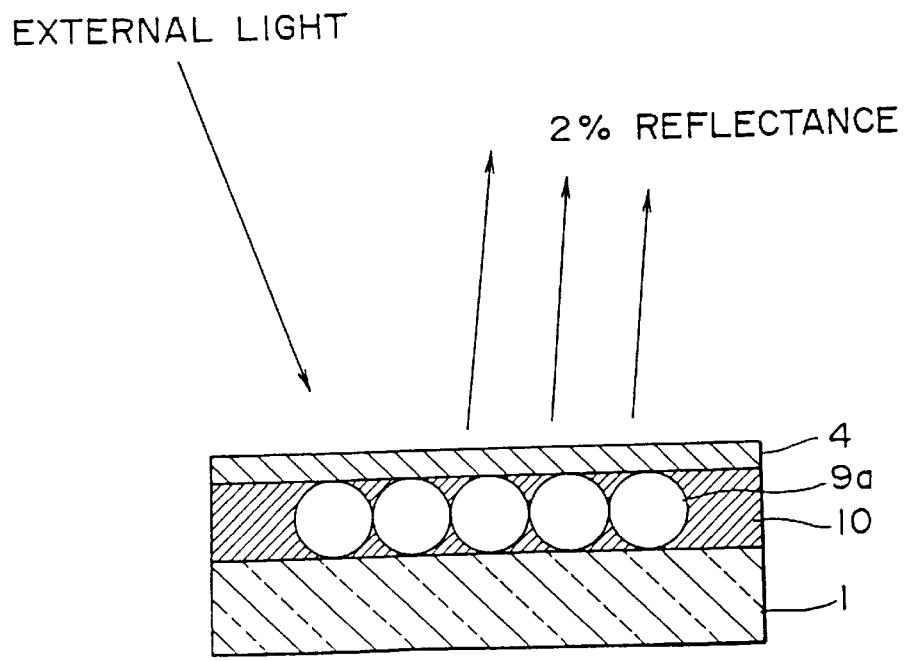

FIGS. 4A and 4B are model diagrams used for explaining a function to suppress the reflection of an external light which function is executed by light diffusing means provided by the present invention. FIG. 4A shows an example used as a reference wherein gaps among the transparent fine particles 9a are not filled up with the transparent filler stuff 10. It should be noted that the transparent fine particles 9a are spread densely over an adhesive film 4a provided on the back side of the polarizing plate 4. In this reference example, an external light is reflected by the front and back faces of the polarizing plate 4 and the front face of the liquid crystal panel 1, inevitably resulting in an effective reflectance of about 10%. Since the reflectance for an external light is high, the display contrast deteriorates. FIG. 4B, on the other hand, shows a structure provided by the present invention wherein gaps among the transparent fine particles 9a are filled up with the transparent filler stuff 10. In this case, the transparent filler stuff 10 has an effect to suppress the reflection of an external light at the back face of the polarizing plate 4 and at the front face of the liquid crystal panel 1, lowering the reflectance to about 2%. As a result, sufficiently good display contrast can be obtained.

Next, an effect of reducing the dependence of the transmissivity on the visual-field angle provided by the present invention is explained by referring to FIGS. 5A and 5B. FIG. 5A shows graphs representing the dependence of the transmissivity upon the visual-field angle of a reference example employing no light diffusing means. The horizontal axis represents the relative intensity at the front whereas the vertical axis represents the relative intensity at angles of ±30 degrees. In the case of the reference example, at the −30-degree angle, at a gradation level of 0% to 50%, an inversion of gradation is observed. On the contrary, at the +30-degree angle, the gradation change is flat over the gradation levels 40% to 100%, indicating that the so-called white-blurring phenomenon occurs. On the other hand, FIG. 5B shows graphs representing the dependence of the transmissivity upon the visual-field angle of an embodiment wherein light diffusing means provided by the present invention is employed. Likewise, the horizontal axis represents the relative intensity at the front whereas the vertical axis represents the relative intensity at angles of ±30 degrees. It is obvious from the graphs that neither the inversion of gradation nor the white-blurring phenomenon occurs even if the observation is carried out at a position in a slanting position.

Figure 6:
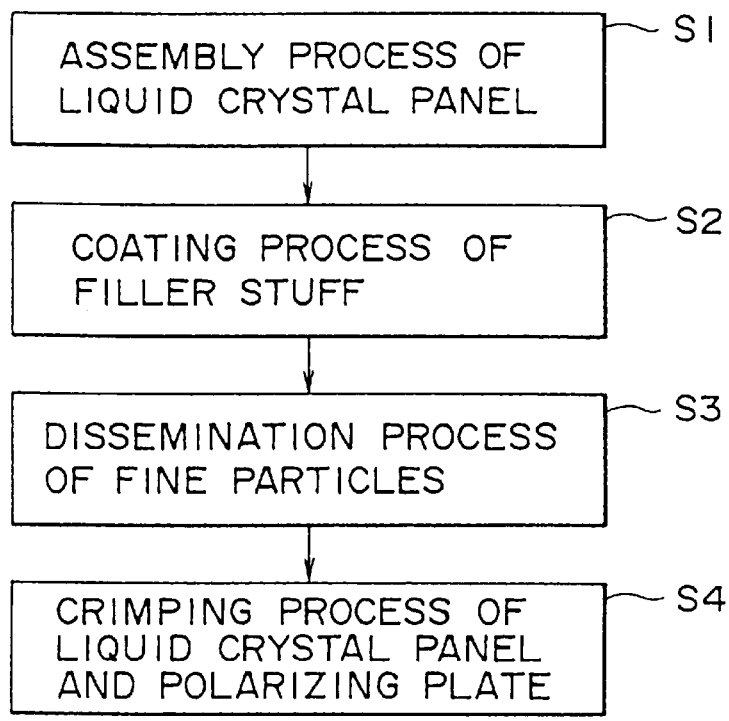
FIG. 6 is a diagram showing processes of a method for manufacturing a liquid crystal display provided by the present invention.
Figure 7:
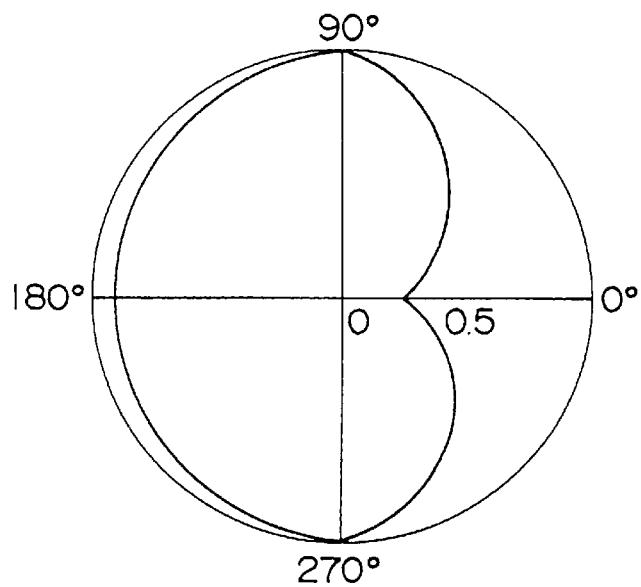
FIG. 7 is a diagram showing the dependence of the transmissivity on the visual field angle.

Finally, the method of manufacturing the liquid crystal display apparatus provided by the present invention is explained by referring to FIG. 6. First of all, in an assembly process S1, a pair of glass plates are stuck to each other, sandwiching a liquid crystal in a gap between the glass plates to form an assembled liquid crystal panel. In a next coating process S2, the surface of one of the glass plates composing the liquid crystal panel is coated with transparent filler stuff to provide a junction layer. Then, in a subsequent dissemination process S3, transparent fine particles are disseminated on a polarizing plate, on which an adhesive film has been created in advance, to create a uniformly spread light diffusing layer. Finally, in a crimping process S4, the light diffusing layer is superimposed on the junction layer and both the layers are pressed against each other to create a single assembly with gaps among the transparent fine particles filled up with the transparent filler stuff. Typically, in the above coating process S2, the glass plate is coated with ultraviolet-light hardening transparent filler stuff. An example of such a transparent filler material is the ultraviolet-light hardening acrylic resin. By setting the viscosity thereof at about 20 cp, gaps among the transparent fine particles can be fully filled up with the transparent filler stuff. In the crimping process S4, while the polarizing plate and the liquid crystal panel are being stuck to each other, an ultraviolet light is applied thereto. The transparent filler stuff is thereby hardened, sticking the polarizing plate and the liquid crystal panel to each other.

As described above, according to the present invention, fine particles are spread all over the gap between the glass plate on the front side of the liquid crystal panel and the polarizing plate to create a light diffusing layer and gaps among the fine particles are filled up with filler stuff having all but the same refraction index as that of the glass plate. This configuration allows the reflection of external lights to be reduced and, thus, the display contrast to be improved while keeping the visual field angle effect provided by the light diffusing layer.

What is claimed is:

1. A liquid crystal display comprising:
   a liquid crystal panel comprising front and back glass plates with a gap disposed therebetween, the gap accommodating a liquid crystal material between the front and back plates;
   a first polarizing plate having a surface facing a front side of said front glass plate of said liquid crystal panel, the surface of the first polarizing plate that faces the front side of the front glass plate being coated with an adhesive film, the front side of the front glass plate being coated with a transparent filler material;
   a directional backlight on a back side of said liquid crystal panel; and
   a light diffusing layer between the front side of said front glass plate of said liquid crystal panel and said first polarizing plate, wherein:
     said directional backlight generates incident light beams which are substantially perpendicular to said liquid crystal panel;
     said light diffusing layer for diffusing said incident illumination light beams leaving said liquid crystal panel and comprises transparent fine particles spread over the adhesive film of the first polarizing plate so that said transparent fine particles are disposed in a space between the front glass plate of said liquid crystal panel and said first polarizing plate, said light diffusing layer further comprising transparent filler material filling up gaps among said transparent fine particles;
     said first polarizing plate being adhered to said front glass plate of said liquid crystal panel by said adhesive film and transparent filler material;
     said transparent fine particles each have a refraction index different from that of said front and back glass plates; and
     said transparent filler material has a refraction index substantially the same as that of said front glass plate wherein the liquid crystal panel is a flat panel and wherein the refraction index of the transparent fine particles is larger than that of the transparent filler material and the transparent filler material is comprised of a degenerated acrylate, the transparent filler material having a viscosity of about 20 cp.

2. A liquid crystal display according to claim 1 wherein a second polarizing plate is placed on the back side of said liquid crystal panel.

3. A liquid crystal display according to claim 1 wherein said directional backlight comprises a light source and a collimating means for collimating light emitted by said light source.

4. A liquid crystal display according to claim 3 wherein said collimating means comprises two layers of prism sheets placed one upon another.

5. A liquid crystal display according to claim 1 wherein said transparent fine particles are each a transparent micro bead.

6. A liquid crystal display according to claim 1 wherein said directional backlight is replaced by a layered structure comprising a non-directional backlight and stripe-shaped barrier ribs created in a plasma cell.

7. A method for manufacturing a liquid crystal display comprising a liquid crystal panel, a polarizing plate placed on a front side of said liquid crystal panel and a directional backlight on a back side of said liquid crystal, said method comprising the steps of:

assembling said liquid crystal panel by sticking a pair of front and rear glass plates to each other and enclosing a liquid crystal in a gap between said glass plates;

creating a junction layer by coating a front surface of the front glass plate or a front surface of the rear glass plate of said liquid crystal panel with transparent filler material;

creating a substantially uniformly spread light diffusing layer by disseminating transparent fine particles on a polarizing plate having an adhesive film formed thereon; and putting said light diffusing layer and said junction layer into a single assembly and filling up gaps among said transparent fine particles with said transparent filler material and wherein a viscosity of the transparent filler material is about 20 cp.

8. A method for manufacturing a liquid crystal display according to claim 7 wherein, in said step of creating a junction layer, an ultraviolet-light hardening material is used as said transparent filler material and, in said process of creating a uniformly spread light diffusing layer, while said polarizing plate and said liquid crystal panel are being pressed against each other, an ultraviolet light is applied thereto.

9. A display device comprising:

first and second spaced apart glass plates having a gap therebetween filled with a liquid crystal;

polarizing plate located over a front side of the first glass plate and having a surface facing an outer surface of the first glass plate, the surface of the polarizing plate being coated with an adhesive film, the outer surface of the first glass plate being coated with transparent filler material;

light diffusing particles spread over the adhesive film and disposed in a gap between the first glass plate and the polarizing plate;

additional transparent filler material formed in gaps among the light diffusing particle, the transparent filler material having a viscosity of about 20 cp; and further wherein the diffusing particles have an index of refraction different from that of the first glass plate and the transparent filler material has an index of refraction substantially the same as that of the first glass plate;

the polarizing plate being adhered to the first glass pate by the adhesive film and the transparent filler material.

10. A liquid crystal display comprising:

a liquid crystal panel comprising front and back glass plates with a gap disposed therebetween, the gap accommodating a liquid crystal material between the first and second plates;

a first polarizing plate having a surface facing a front side of the front glass plate of said liquid crystal panel, the surface of the first polarizing plate that faces the front side of the front glass plate being coated with an adhesive film;

a directional backlight on a back side of said liquid crystal panel; and a light diffusing layer between the front side of the front glass plate of said liquid crystal panel and said first polarizing plate, wherein:

said directional backlight generates incident light beams which are substantially perpendicular to said liquid crystal panel;

said light diffusing layer for diffusing said incident illumination light beams leaving said liquid crystal panel and comprises transparent fine particles spread over the adhesive film of the first polarizing plate so that said transparent fine particles are disposed in a space between the front glass plate of said liquid crystal panel and said first polarizing plate, said light diffusing layer further comprising transparent filler material filling up gaps among said transparent fine particles;

said first polarizing plate being adhered to said front glass plate of said liquid crystal panel by said adhesive film and transparent filler material;

said transparent fine particles each have a refraction index different from that of said front and back glass plates; and said transparent filler material has a refraction index substantially the same as that of said front glass plate wherein the liquid crystal panel is a flat panel and wherein the refraction index of the transparent fine particles is larger than that of the transparent filler material, the transparent filler material having a viscosity of about 20 cp.

* * * * *